(12) United States Patent
Verrier et al.

(10) Patent No.: US 8,742,635 B2
(45) Date of Patent: Jun. 3, 2014

(54) TURBO GENERATOR WITH EXCITER HAVING PRESSURE RECOVERY

(75) Inventors: Michel Verrier, Essert (FR); Olivier Perros, Belfort (FR); Lennart Diestel-Feddersen, Brugg (CH)

(73) Assignee: Alstom Technology Ltd., Baden (CH)

( * ) Notice: Subject to any disclaimer, the term of this patent is extended or adjusted under 35 U.S.C. 154(b) by 1766 days.

(21) Appl. No.: 11/688,307

(22) Filed: Mar. 20, 2007

(65) Prior Publication Data
US 2008/0231125 A1 Sep. 25, 2008

(51) Int. Cl.
H02K 5/20 (2006.01)
H02K 9/16 (2006.01)
H02K 9/18 (2006.01)
H02K 19/38 (2006.01)

(52) U.S. Cl.
USPC .............................................. 310/59; 310/64

(58) Field of Classification Search
CPC .................................................... H02K 19/38
USPC ............................. 310/56, 58, 59, 64, 65, 91
See application file for complete search history.

(56) References Cited

U.S. PATENT DOCUMENTS

| | | | | |
|---|---|---|---|---|
| 3,643,119 A | * | 2/1972 | Lukens | 310/60 R |
| 3,858,069 A | * | 12/1974 | Kuter et al. | 310/68 D |
| 4,900,959 A | * | 2/1990 | Drinkut et al. | 310/68 D |
| 5,019,737 A | * | 5/1991 | Bruno | 310/89 |
| 5,276,373 A | * | 1/1994 | Zimmermann et al. | 310/58 |
| 5,894,178 A | * | 4/1999 | Stefan | 310/61 |
| 6,472,782 B1 | * | 10/2002 | Selci | 310/63 |
| 6,844,639 B2 | | 1/2005 | Lacaze | |

FOREIGN PATENT DOCUMENTS

EP 1443639 8/2004

* cited by examiner

*Primary Examiner* — Burton Mullins
*Assistant Examiner* — Eric Johnson
(74) *Attorney, Agent, or Firm* — Buchanan Ingersoll & Rooney PC

(57) ABSTRACT

A turbo generator (1), including a stator and a rotor (2), has a rotating bell type exciter (3) connected to one end of the rotor (2) and the exciter (3) being equipped with at least one cooler (7). An axial duct (11) with a guide (12) is provided between a cylindrical housing (13) and the outer circumference of the bell type exciter (3). Thus, drawbacks of the prior art are mitigated and the efficiency of the bell type exciter is increased by recovering the dynamic energy of the cooling fluid flow.

14 Claims, 5 Drawing Sheets

TURBO GENERATOR WITH EXCITER HAVING PRESSURE RECOVERY

BACKGROUND

1. Field of the Invention

The present invention relates to a turbo generator having a stator and a rotor, a rotating bell type exciter connected to one end of the rotor, and being equipped with at least one cooler.

2. Brief Description of the Related Art

Large turbo generators for producing electric energy are designed as three-phase synchron machines having a stator and a rotor. One end of the rotor is connected to a turbo machine while the other end is connected to an exciter.

European patent application EP 1 443 639 A1 (see also U.S. Pat. No. 6,844,639) by the same assignee discloses the electrical function of a rotating exciter for large currents. The rotor has at least two conducting rods essentially parallel to the rotor axis and connected at their first end to a collector ring and connected at their other ends to individual rings via diodes of opposite polarity so that the a.c. current induced in the rods as a result of a static field is converted into a direct field in both rings.

One exciter type known in the art is the bell type exciter 3 as schematically shown in a partial sectional view in FIG. 6 herein. The turbo generator 1 has its rotor 2 connected to one end to the bell type exciter 3. The exciter 3 has multi-phase windings 4 rotating around a static portion 8. The exciter current is passed through diodes 5 to convert the alternating current into direct current and then fed into the respective rotor windings of the turbo generator 1. The rotating exciter is, in other words, the opposite of a generator. The windings of the static portion 8 of the exciter 3 are fed with direct current and the anchor is the rotating bell 10 of the exciter 3 producing alternate current.

The turbo generator 1 including the exciter 3 is on its lower portion based on the ground 6 and confined by a casing 9. Above the exciter 3 and opposite to the ground 6, one or more coolers 7 are arranged within the casing 9 to reduce the temperatures in the exciter 3 and thus increase the efficiency of the exciter 3.

One draw back of the prior art is that, in order to enhance the efficiency of the cooler and or to obtain redundancy in case of failure of one cooler, the number of coolers needs to be increased and/or the coolers need to be enlarged. This conflicts with limitations in space available at the respective site of the power plant. A further draw back of the prior art is the fact that the bell type exciter conveys cooling fluid from the center to its outer circumference. The tangential speed of this cooling fluid flow is quite high and the corresponding kinetic energy is lost.

SUMMARY

Accordingly, the technical problem to be solved by the present invention is to avoid the described draw backs of the prior art and to provide a way of increasing the pressure head and improving the efficiency in a bell type exciter.

According to one aspect of the present invention, an axial duct is provided between a cylindrical housing and the outer circumference of the bell type exciter. The housing is arranged concentrically around the rotating exciter. On the inner circumference of the cylindrical housing, several guides for guiding a fluid are arranged to convert the tangential fluid flow created by the exciter into an axial flow. By converting the tangential flow into an axial flow, a major portion of the dynamic energy of the fluid is transformed into additional pressure head at the cooler, instead of being merely transformed in heat and losses as it is the case in the prior art. Further, by applying the described pressure recovering air guide, also the flow rate may be increased. Thus the drawbacks of the prior art are avoided and the efficiency of the bell type exciter is increased by recovering the dynamic energy of the cooling fluid flow. The simple but effective construction may also be used to upgrade existing bell type exciters in the prescribed way to enhance the efficiency and redundancy of the coolers.

An advantageous embodiment of the present invention suggests that the guides are provided as bent sheets or plates. This is a simple version for dynamic pressure recovery by re-orientation of the flow direction.

Another preferred, exemplary embodiment suggests that the guides are provided as guide vanes having an airfoil. This "banana" version of the guides provides a better performance than the simple guides made of bent metal sheets and reduces the vortex and losses.

A further advantageous, exemplary embodiment of the present invention suggests that the guides are provided as structural stiffening elements for the housing. Thus the guides may support the frame in carrying the static parts of the exciter. This leads to a compact design adapted to arrange, e.g., two coolers in series and to be able to have 100% performance with one cooler out of service.

Yet another preferred embodiment suggests that the guides are arranged on the inner circumference of the cylindrical housing. Thus, the guides are stationary while the bell is rotating.

Still another preferred embodiment suggests that the guides are arranged to direct the cooling fluid through the cooler. According to this embodiment, the downstream part of the cooling fluid is directed in the portion of the casing with a higher pressure than the surrounding fluid. This is the inlet side of the cooler.

Another preferred embodiment suggests that the guides are J-shaped in axial direction to allow redirecting the tangential flow into an axial flow. By this, the guides are creating defined flow channels over the whole length of the axial duct. This provides advantages over using guides only over part of the length of the axial duct.

Finally, another embodiment of the present invention suggests that the distance between two neighboring guides is enlarging towards the downstream position. Thus, the guides perform a diffuser like function and transform the velocity of the cooling fluid into pressure head between the inlet and outlet of the cooler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
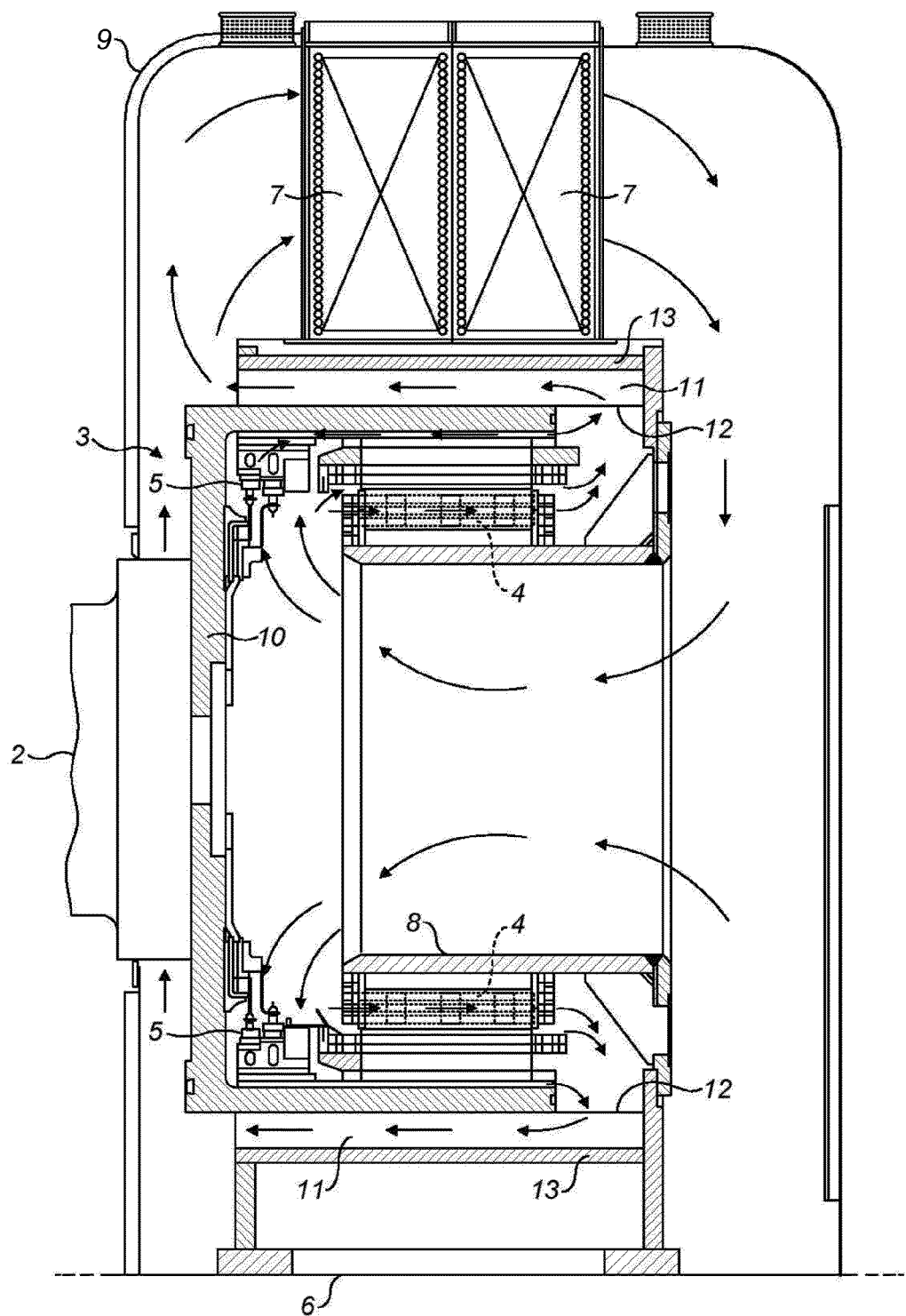
FIG. 1 shows a schematic sectional view of a bell type exciter having an axial duct with guides according to a preferred embodiment of the present invention.

Referring now to the drawings, wherein like reference numerals designate identical or corresponding parts throughout the several views, preferred exemplary embodiments of the invention are reproduced in FIGS. 1 through 5. The drawings are merely schematic sketches and serve explicatory reasons only.

Figure 2:
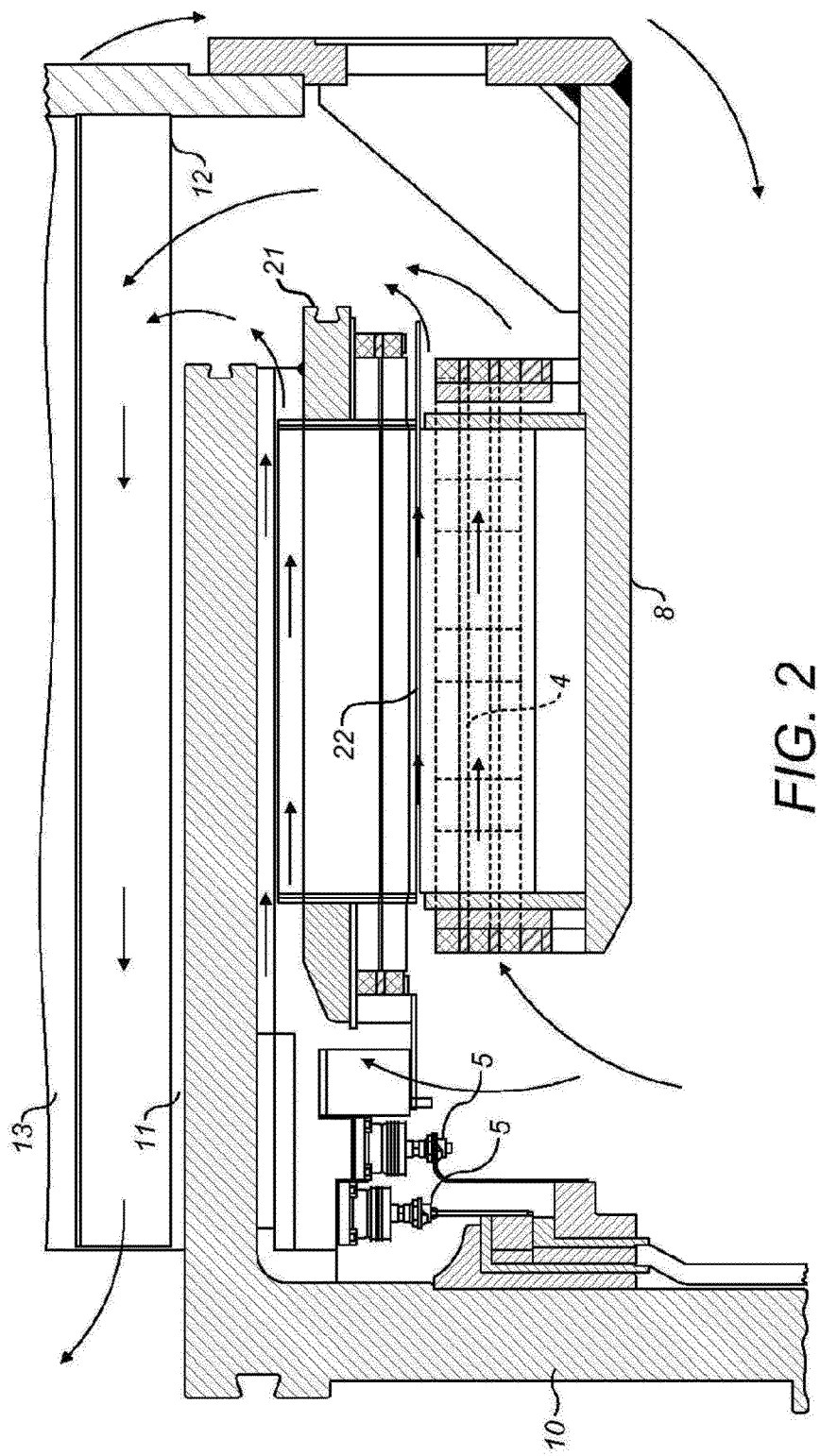
FIG. 2 shows a detail view of FIG. 1.
Figure 3:
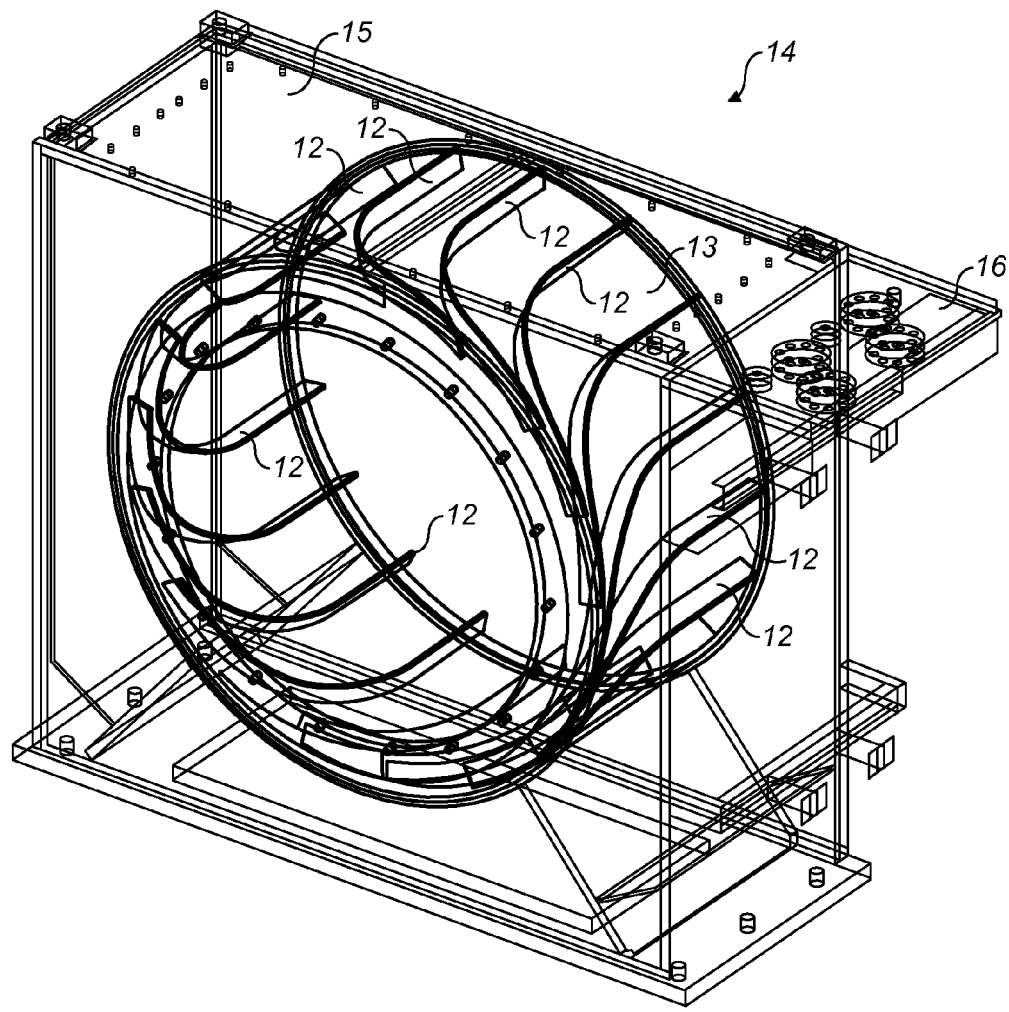
FIG. 3 shows a separate perspective view of the cylindrical housing and the guides.

FIG. 1 shows a schematic sectional view of a bell type exciter 3 having an axial duct 11 with a guide 12 according to a preferred embodiment of the present invention. FIG. 2 shows a detail of FIG. 1.

The turbo generator has its rotor 2 connected to one end to the bell type exciter 3. The exciter 3 has on its inner circumference multi-phase windings 4 arranged on top of the lamination 21 (FIG. 2) and rotating around a static portion 8. There is a small gap 22 (FIG. 2) between the windings 4 and the static portion 8 which allows a cooling fluid flow going therethrough. The exciter current is passed through diodes 5 to convert the alternating current into direct current and then fed into the respective rotor windings of the turbo generator 1. The exciter 3 is on its lower portion based on the ground 6 and confined by a casing 9. Above the exciter 3 and opposite to the ground 6, two coolers 7 are arranged in series within the casing 9 to reduce the temperatures in the exciter 3 and thus increase the efficiency of the exciter 3.

The axial duct 11 is created by the outer circumference of the bell 10 and the inner circumference of a cylindrical housing 13. The housing 13 can also be seen in FIG. 3 as perspective single part. At the inner circumference of the housing 13 several J-shaped guides 12 are arranged. The J-shaped guides 12 are made of flat metal sheet and are welded onto the housing 13. The housing 13 is held in a frame 14, which is a steel construction. On the upper side, the frame 14 is equipped with a holding plate 15 for the coolers 7 and a tube guiding plate 16 for the tubing of the coolers 7. The link to the ground is managed by two end plates.

In FIG. 1 and FIG. 2 the flow path of the cooling fluid, which is air in the present embodiment, is indicated by black arrows. The cooling air is sucked into the static portion 8 of the exciter 3 and streams into the gap between the static portion 8 and the rotating bell 10. Due to the rotational speed of the bell 10, the air flow gains energy in the form of velocity. The air leaving the gap turns outward into the radial direction and enters the axial duct 11 with the J-shaped guides 12. After leaving the axial duct 11, the energy of the fluid is converted from velocity into pressure, i.e., the static pressure head between the inlet and outlet of the J-shaped guides 12 is increased, improving the efficiency of the exciter.

Figure 4:
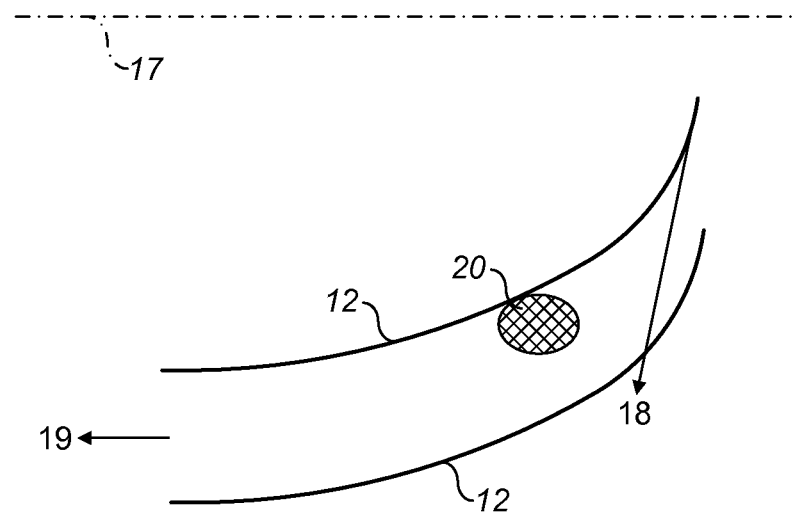
FIG. 4 shows a schematic view of the guides according to a first embodiment of the present invention.

FIG. 4 illustrates a schematic sketch of two neighboring guides 12 in the axial duct with respect to the machine axis 17 of the exciter 3 according to a first preferred embodiment. In this embodiment, the generally J-shaped guides 12 are made of bent metal plates or sheets. The flow velocity at the inlet of the axial duct, i.e., at the end of the gap between the exciter bell and the static portion, is indicated by a vector arrow 18. The speed of the inlet flow is indicated by the length of the arrow 18 and the direction of the flow is indicated by the direction of the arrow 18. The flow direction and velocity at the outlet of the axial duct is indicated by a vector arrow 19. The speed of the outlet flow is indicated by the length of the arrow 19 and the direction of the flow is indicated by the direction of the arrow 19.

At the inlet of the axial duct, the flow direction is affected by the rotating exciter and therefore the flow direction is in the tangential direction. Due to the high speed rotation of the exciter, the velocity of the flow is relatively high. At the outlet, the flow direction has been re-oriented by the guides 12 into an axial flow direction, i.e., in parallel to the machine axis 17. The flow velocity is relatively low; however, the static pressure is increased.

In FIG. 4, an area of vortex and losses 20 of the flow is marked by a circle.

Figure 5:
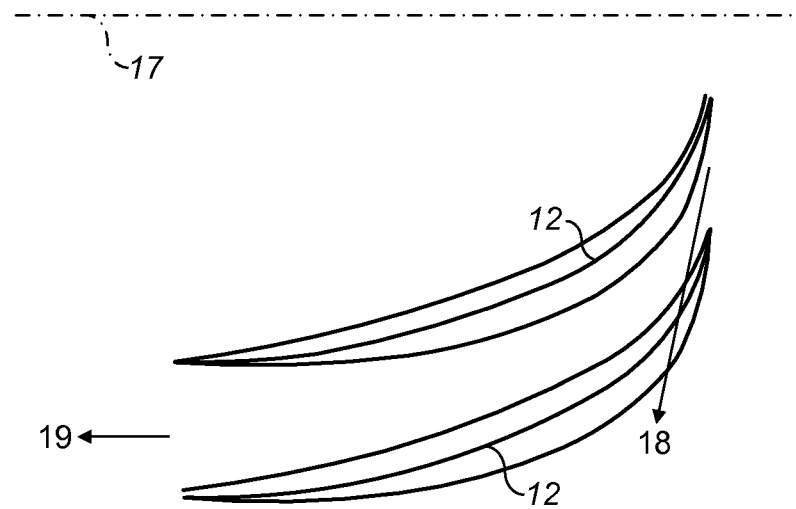
FIG. 5 shows a schematic view of the guides according to a second embodiment of the present invention.
Figure 6:
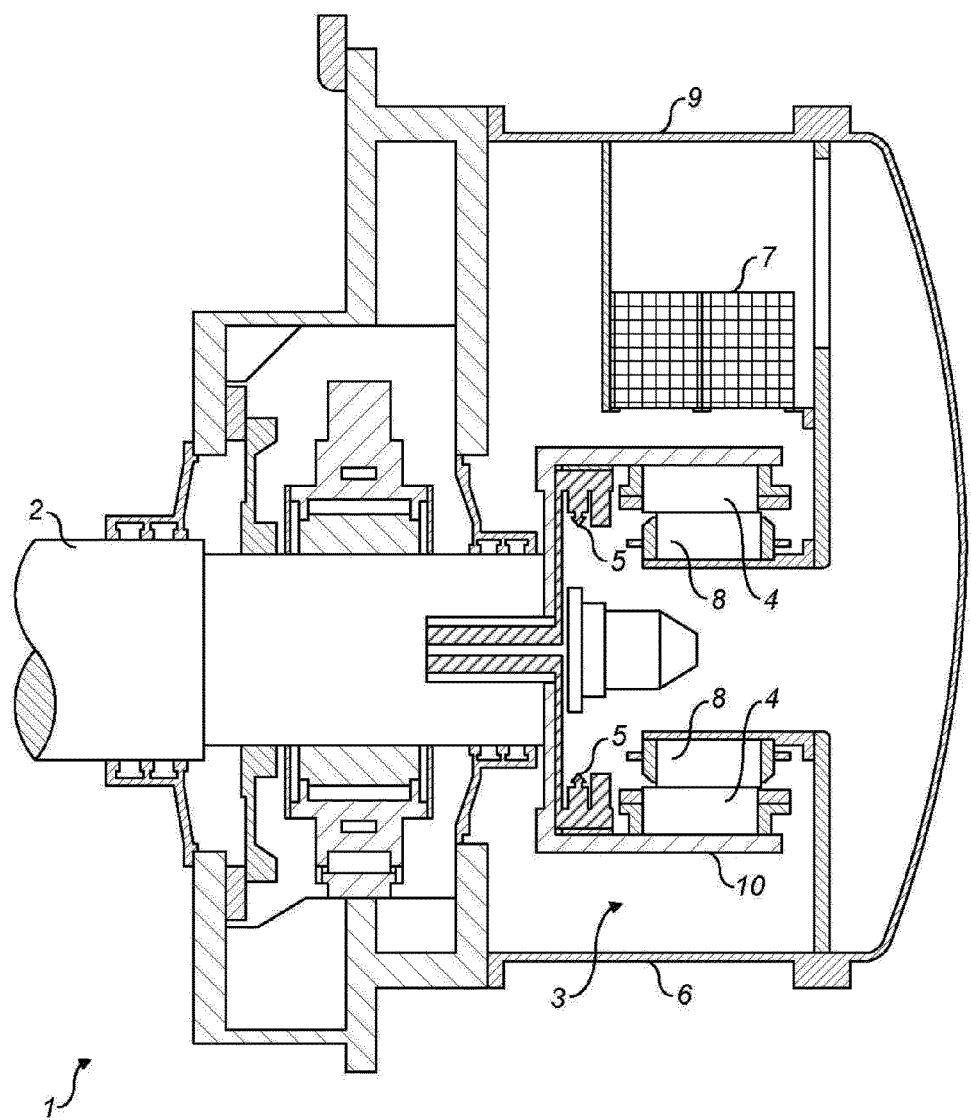
FIG. 6 shows a partial sectional view of a turbo generator with bell type exciter according to the prior art.

FIG. 5 illustrates a schematic sketch of two neighboring guides 12 in the axial duct with respect to the machine axis 17 of the exciter according to a second preferred embodiment. In this embodiment, the guides 12 are small airfoils in order to improve the performance and in order to eliminate the vortex and losses as shown in FIG. 4. Also in the second embodiment the flow direction at the inlet of the axial duct is affected by the rotating exciter and therefore the flow direction is in the tangential direction (arrow 18). Due to the high speed rotation of the exciter, the velocity of the flow is relatively high. At the outlet, the flow direction has been re-oriented by the guides 12 into an axial flow direction (arrow 19), i.e., in parallel to the machine axis 17. The flow velocity is relatively low; however, the static pressure is increased.

It will be clear to the person skilled in the art that numerous modifications and variations of the present invention are possible in the light of the above teaching. It is therefore to be understood that, within the scope of the appended claims, the invention may be practiced otherwise than described herein.

In both embodiments of FIG. 4 and FIG. 5, the distance between two neighboring guides 12 is enlarging towards the downstream position. Thus, the guides 12 fulfill a diffuser-like function and transform the velocity of the cooling fluid into increased static pressure. This leads to an increased pressure head at the cooler inlet, and thus more pressure head is available for the coolers 7 that can result in an increased efficiency of the coolers.

REFERENCE SIGNS 1 turbo generator
2 rotor
3 exciter
4 multi-phase winding
5 diodes
6 ground
7 cooler
8 static portion
9 casing
10 bell
11 axial duct
12 guide
13 housing
14 frame
15 holding plate
16 tube guiding plate
17 machine axis
18 inlet flow
19 outlet flow
20 area of vortex and losses
21 lamination
22 gap While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A turbo generator comprising:
   a stator;
   a rotor having an end and a rotating bell exciter connected to the end of the rotor, the exciter having an outer circumference and including at least one cooler;
   a cylindrical housing; and
   an axial duct including a guide, the duct located between the cylindrical housing and the outer circumference of the bell exciter.

2. The turbo generator according to claim 1, wherein the exciter is positioned concentrically in the cylindrical housing.

3. The turbo generator according to claim 1, wherein the guide comprises bent sheets.

4. The turbo generator according to claim 1, wherein the guide comprises guide vanes having an airfoil.

5. The turbo generator according to claim 1, wherein the guide comprises structural stiffening elements for the cylindrical housing.

6. The turbo generator according to claim 1, wherein the guide is arranged on the inner circumference of the cylindrical housing.

7. A turbo generator comprising:
   a stator;
   a rotor having an end and a rotating bell exciter connected to the end of the rotor, the exciter having an outer circumference and including at least one cooler;
   a cylindrical housing; and
   an axial duct including a guide, the duct located between the cylindrical housing and the outer circumference of the bell exciter, wherein the guide comprises elements J-shaped in the axial direction to allow redirecting tangential flow into axial flow.

8. The turbo generator according to claim 1, wherein the guide comprises two adjacent guides the distance between which enlarges downstream.

9. The turbo generator according to claim 1, wherein the axial duct extends from a first end to a second end and the guide extends from the first end to the second end.

10. The turbo generator according to claim 1, wherein the guide has a first end, a second end, a curved portion that extends from the first end to a position intermediate the first end and the second end, and an axial portion that extends parallel to the axis from the intermediate position to the second end.

11. The turbo generator according to claim 10, wherein the first end is closer to the axis than the second end.

12. The turbo generator according to claim 7, wherein the J-shaped guide has a first end, a second end, a curved portion that extends from the first end to a position intermediate the first end and the second end, and an axial portion that extends parallel to the axis from the intermediate position to the second end.

13. The turbo generator according to claim 1, wherein the guide includes portions positioned radially adjacent and outside of the outer circumference of the bell exciter.

14. A turbo generator comprising:
   a stator;
   a rotor having an end and a rotating bell exciter connected to the end of the rotor for rotation about an axis, the exciter having an outer circumference and including at least one cooler and windings;
   a housing; and
   an axial duct including a guide, the duct located between the housing and the outer circumference of the bell exciter, and the guide extending along the axis beyond each end of the windings.

* * * * *